United States Patent
Koehn et al.

(10) Patent No.: US 8,642,147 B2
(45) Date of Patent: Feb. 4, 2014

(54) TUBULAR FILM, DEVICE AND METHOD FOR PRODUCING THE SAME

(75) Inventors: Uwe Koehn, Osnabrueck (DE); Jan Thorsten Weber, Lengerich (DE); Juergen Steinberg, Hoerstel (DE)

(73) Assignee: Windmoeller & Hoelscher KG, Lengerich (DE)

( * ) Notice: Subject to any disclaimer, the term of this patent is extended or adjusted under 35 U.S.C. 154(b) by 1203 days.

(21) Appl. No.: 10/545,687

(22) PCT Filed: Feb. 13, 2004

(86) PCT No.: PCT/EP2004/001747
§ 371 (c)(1),
(2), (4) Date: Aug. 15, 2006

(87) PCT Pub. No.: WO2004/072528
PCT Pub. Date: Aug. 26, 2004

(65) Prior Publication Data
US 2007/0148382 A1  Jun. 28, 2007

(30) Foreign Application Priority Data
Feb. 14, 2003  (DE) .................................. 103 07 678

(51) Int. Cl.
*B32B 5/20* (2006.01)
(52) U.S. Cl.
USPC .. 428/36.7; 156/304.6; 156/515; 156/244.18; 156/244.22; 264/171.28; 264/173.14
(58) Field of Classification Search
USPC ..................... 156/290, 554; 426/124; 53/552; 493/231
See application file for complete search history.

(56) References Cited

U.S. PATENT DOCUMENTS

| 3,555,973 | A | | 1/1971 | Rochla |
| 3,585,907 | A | | 6/1971 | Rochla |
| 4,062,712 | A | * | 12/1977 | Stark .......................... 156/244.13 |
| 4,085,560 | A | * | 4/1978 | McClosky ........................ 53/449 |
| 4,478,670 | A | * | 10/1984 | Heyse et al. ................ 156/380.1 |
| 4,959,114 | A | | 9/1990 | Mundus |
| 6,004,427 | A | | 12/1999 | Köhn |
| 6,231,237 | B1 | | 5/2001 | Geller |
| 6,233,903 | B1 | | 5/2001 | Ide |
| 6,401,439 | B1 | | 6/2002 | Tetenborg et al. |
| 6,425,847 | B1 | | 7/2002 | Broenstrup |
| 6,460,317 | B1 | | 10/2002 | Voss |
| 2004/0115318 | A1 | * | 6/2004 | Janssen et al. ................. 426/124 |

FOREIGN PATENT DOCUMENTS

| DE | 1 436 857 | | 9/1971 |
| DE | 36 24 573 | A1 | 1/1988 |
| DE | 38 20 941 | A1 | 12/1989 |
| DE | 689 18 268 | T2 | 2/1995 |
| DE | 197 12 498 | A1 | 10/1998 |
| DE | 199 20 478 | A1 | 11/2000 |

(Continued)

*Primary Examiner* — Ellen S Raudenbush
(74) *Attorney, Agent, or Firm* — Jacobson Holman PLLC

(57) ABSTRACT

A process that is faster than conventional processes for manufacturing a film tube from a polymer and/or metal film material includes moving the film tube in relation to the joining tools during the joining process. Before the joining process of the film tube, the metal film material exists in the form of at least one film web. The edges of this film web are joined to one another in a joining process forming at least one longitudinal joint seam. During the joining process the film tube is moved in relation to the joining tools.

13 Claims, 6 Drawing Sheets

(56) References Cited

FOREIGN PATENT DOCUMENTS

| | | |
|---|---|---|
| DE | 199 36 660 A1 | 11/2000 |
| DE | 199 33 446 C1 | 3/2001 |
| EP | 0 255 014 B1 | 2/1988 |
| EP | 0 783 442 B1 | 7/1997 |
| EP | 1 034 918 A2 | 9/2000 |
| EP | 1 069 430 A1 | 1/2001 |
| FR | 1464710 | 1/1967 |
| WO | WO 90/05627 A1 | 5/1990 |

* cited by examiner

TUBULAR FILM, DEVICE AND METHOD FOR PRODUCING THE SAME

CROSS-REFERENCE TO RELATED APPLICATION

This is a nationalization of PCT/EP2004/001747 filed 13 Feb. 2004 and published in German.

BACKGROUND OF THE INVENTION

1. Field of Invention

The present invention relates to a device and a process for manufacturing a film tube. Furthermore, the process aims to provide protection for the film tube itself.

2. Description of the Prior Art

Film tubes are used, among others, in the so-called Form, Fill and Seal Machines, referred to in the following description as FFS machines. These machines are disclosed in the published patents DE 199 33 446, DE 199 20 478 and DE 199 36 660. The FFS machines have unwinding stations on which film tubes are stored. These unwinding stations unwind film tubes and separate them into film tube segments. Usually in the later process steps, the film tubes are provided with bottoms, the resulting bag is filled with the filling material and the bag is sealed.

Usually, film tubes are formed by blown film extrusion for the purpose of processing using FFS machines. The format of these film tubes (here, their periphery) is in agreement with the bag to be formed subsequently. This approach necessitates the relatively expensive replacement of formats in the blown film extrusion plants for the purpose of realizing different bag formats. Moreover, the formats required for the bag formation are relatively small and hence cannot be manufactured economically. Blown film extrusion plants of bigger format produce the same foil at much lesser costs per unit of area.

Therefore, experiments have been conducted many times with the purpose of first manufacturing very broad film webs by flat film extrusion or by blown film extrusion using machines of a bigger format. Here also, blown film extrusion plants were preferred primarily for cost reasons. The resulting film tubes or film webs of a big format were then processed further into flat film webs by cutting them as per the format required. Subsequently, one of these laid-flat film webs is folded up and joined by a longitudinal joint seam to form a film tube. A disadvantage of such usually very short film tubes is that the thick joint created by the longitudinal joint seam complicates the winding process of the film tube, since the rolled-up film tube tends to telescope, i.e. it assumes a frusticonical shape, due to the addition of the thick joints.

Even film tube segments are produced in a similar manner for the purpose of manufacturing bags of a higher quality. Thus, for instance, the manufacture of side-gusset pouches or side-gusset bags is known from prior art that are formed out of several film segments. For this purpose the edges of each of the film segments are usually sealed together. This process is carried out between sealing jaws that clamp the material to be sealed during the sealing process.

This method necessitates the intermittent conveyance of the tube material during the entire tube-forming process and thus results in extremely low production speeds. Therefore the objective of the present invention is to propose a process that can be executed faster for manufacturing a film tube out of at least one film web.

SUMMARY OF THE INVENTION

This objective is achieved by moving the film tube in relation to the joining tools during the joining process.

If two or more film webs are used for manufacturing the film tube, then more joint seams and/or thick joints are used accordingly so as to prevent the rolled-up film tubes from telescoping, particularly if the thick joints are distributed evenly over the outer periphery of the tube.

In the prior art mentioned above, the intermittent conveyance of the film tube segments between the various machining steps takes place orthogonal to the axes of the tube segments in order to improve the process of forming the bottoms or covers of the bags to be formed later. This is described, among others, in the patent application EP 1 034 918.

However, it is advantageous to form the film tube by conveying the film web along its longitudinal side pointing in the direction of the axis of the bag formed subsequently. In this manner it is possible, for instance, to unwind the film material from a first winding station while the finished tube is wound up into a different roll.

It is advantageous if the joining process according to the present invention is carried out continuously over a definite time-frame. The process proposed by the present invention also requires the film tubes to have a definite minimum length so that they can be advantageously processed further. Long film tubes of such type did not exist so far since they could not be manufactured using the intermittent manufacturing processes in which the transport direction of the tube segments runs perpendicular to the film tube axis. In these processes the length of the machine restricts the length of the film tube.

At this point it must be emphasized once more that the term 'joining' used frequently in this patent application includes all types of joining processes such as welding, gluing, joining by the use of extrudate, etc.

It is greatly advantageous if the film tube is conveyed immediately after the joining process in the direction of the gravitational force because in this manner liquid or liquefied material of the joint seam does not leak from the area of the joint seam.

It is particularly advantageous if the device according to the present invention comprises of joining tools designed as rollers. The rollers can exert the necessary contact pressing force on the areas of the films that are to be joined. They can also be designed as welding rollers and can provide the heat energy required for a thermally induced joining process.

An alternate joining process is gluing with the help of a congenerous extrudate, which can be e.g. an adhesive or a melt. The possible design forms of the extruder, its extrusion devices and nozzles are described further in the dependent claims. In this connection it is advantageous if the nozzles or nozzle areas can be deviated or displaced in such a manner that they do not wet the film web by continuing to drip on them during shutdown. A particularly advantageous embodiment of the present invention illustrated in this description comprises of a device for feeding the extrudate or extruder arms with two nozzles. The edges of both the front film webs A and D are impinged with extrudate in the manner illustrated with these film webs lying on the squeegee rollers 14 and 15 before their arrival into the roller clearance.

BRIEF DESCRIPTION OF THE DRAWINGS

It must be repeated here that the length of the film tube is of particular significance to its ability to be processed further since the formation of a roll of film tube out of the thus manufactured tube opens up cost-effective and new alternatives for further processing.

Additional preferred embodiments of the present invention are set forth in the following description and in the claims in conjunction with a drawing of which the individual figures illustrate:

DETAILED DESCRIPTION OF THE PREFERRED EMBODIMENTS

Figure 1:
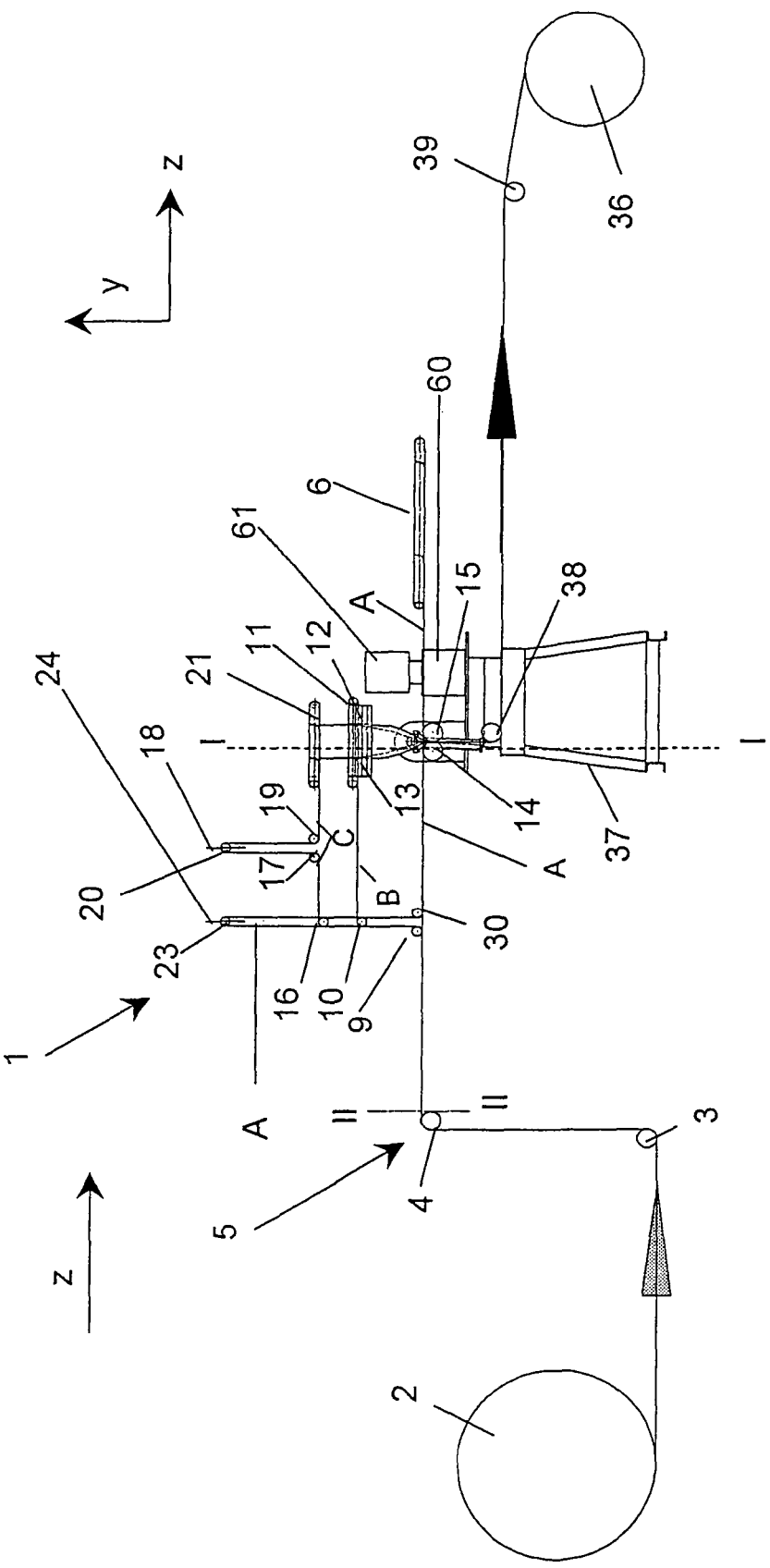
FIG. 1 Side view of a device according to the invention

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The figures illustrate a device 1 according to the present invention whose functioning is described below particularly in terms of the path of the film web E through the device 1. The device comprises of an unwinding station 2 that unwinds the film web E. The film web E is transported, as indicated by the arrow in the direction z of the axis of the film tube that is formed subsequently, and is fed by means of the deflecting rollers 3 and 4 to the cutting station 5 that is symbolized here only by the line II-II. The cutting station comprises of cutting tools (not illustrated) that are used to cut the web E into the film webs A, B, C and D.

The film web A is turned twice on the turning bars 6 and 7 so that it reverses its direction and is finally fed along the direction z to the joining station 8. In this context it must be mentioned that the turning bar 6 is displaceable in the z-direction so that the longitudinal register of the film web A can be adjusted here. This instance is marked by the arrow 45.

The film web B is guided by means of the rollers 9 and 10, the turning bar 11 and the roller 12. At this juncture, it moves temporarily in the x-direction. The film web moves above the joining station 8 by means of the roller 13 that guides it in the direction of the roller clearance 50 between the squeegee rollers 14 and 15. The film web moves between the roller 13 and the roller clearance 50 across a triangle 51 illustrated in FIG. 4 made of section tubes. The film web B that was lying flat previously is folded in this manner so that soon after being squeezed by the squeegee rollers 14 and 15 in the roller clearance a clearly defined folded edge is formed that forms a side gusset 26 in the finished film tube 25.

Figure 4:
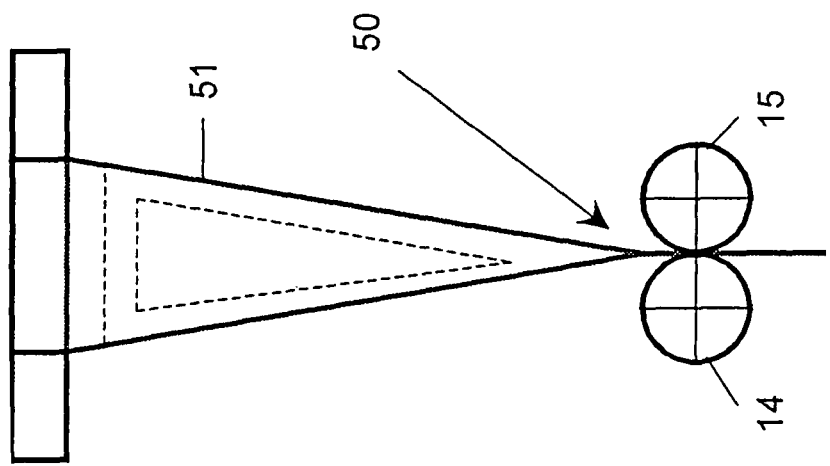
FIG. 4 A sketch of the course of path before the roller clearance 50

Additional components of the machine pursuant to the invention are not illustrated in FIG. 4.

The longitudinal register of the film web B can also be corrected by displacing the roller 12 in the x-direction (arrow 46).

The film web C is first guided by means of the rollers 9, 16, 17 and 19 where the arrow 20 marks the displaceability of the roller 18 in the y-direction, which again enables a correction of the longitudinal register of the film web C. After passing the roller 19, the film web C moves using the turning bar 21, then moves in x-direction toward the roller 22. The roller 22 turns the film web C downward in the direction of the roller clearance 50 defined by the squeegee rollers 14 and 15. The formation of a side gusset by the folded edge in film web C takes place similar to the aforementioned processing of film web B: After being deflected by the roller 22, the film web C moves across a triangle (not illustrated) made of section tubes whose vertex points toward the roller clearance 50. The film web C thus arrives in the roller clearance 50 in a folded manner. It must be noted here that there are also other alternatives of forming folded edges on film webs and forming side gussets on film tubes or bags that can also be used in the device pursuant to the invention.

The flat film web D moves through the cutting station 5, then using the rollers 9, 23, 30, into the roller clearance 50 defined by the squeegee rollers 14 and 15. The displaceability of the roller 23 in the y-direction marked by the arrow 24 enables a correction in the longitudinal register of the film web D.

Thus in the illustrated embodiment of the device 1 according to the invention, all the film webs A-D required for forming the film tube are joined together in the joining station 8 or more precisely in the roller clearance 50 defined by the squeegee rollers 14 and 15.

Two extrusion devices 31 provide extrudate in order to join the joint seams 27 firmly to one another. Strictly speaking, the extrudate is supplied in the extruder 32 in which an extruder screw generates high pressure. The extrudate is transported by means of the extruder arms 33a,b and using the roller clearance 50 to the joining station 8. Here the extrudate is extruded by the nozzles 34 a, b, 35 a, b provided for this purpose onto the edges of the film webs A-D that are joined to one another in the roller clearance 50 immediately after this process.

Usually the extrudate is applied in a heated state so that its coagulation joins the film webs more tightly. Polyolefins can be used as extrudates. However, it is also possible to use all forms of adhesives or to weld the edges of the film webs.

Figure 3:
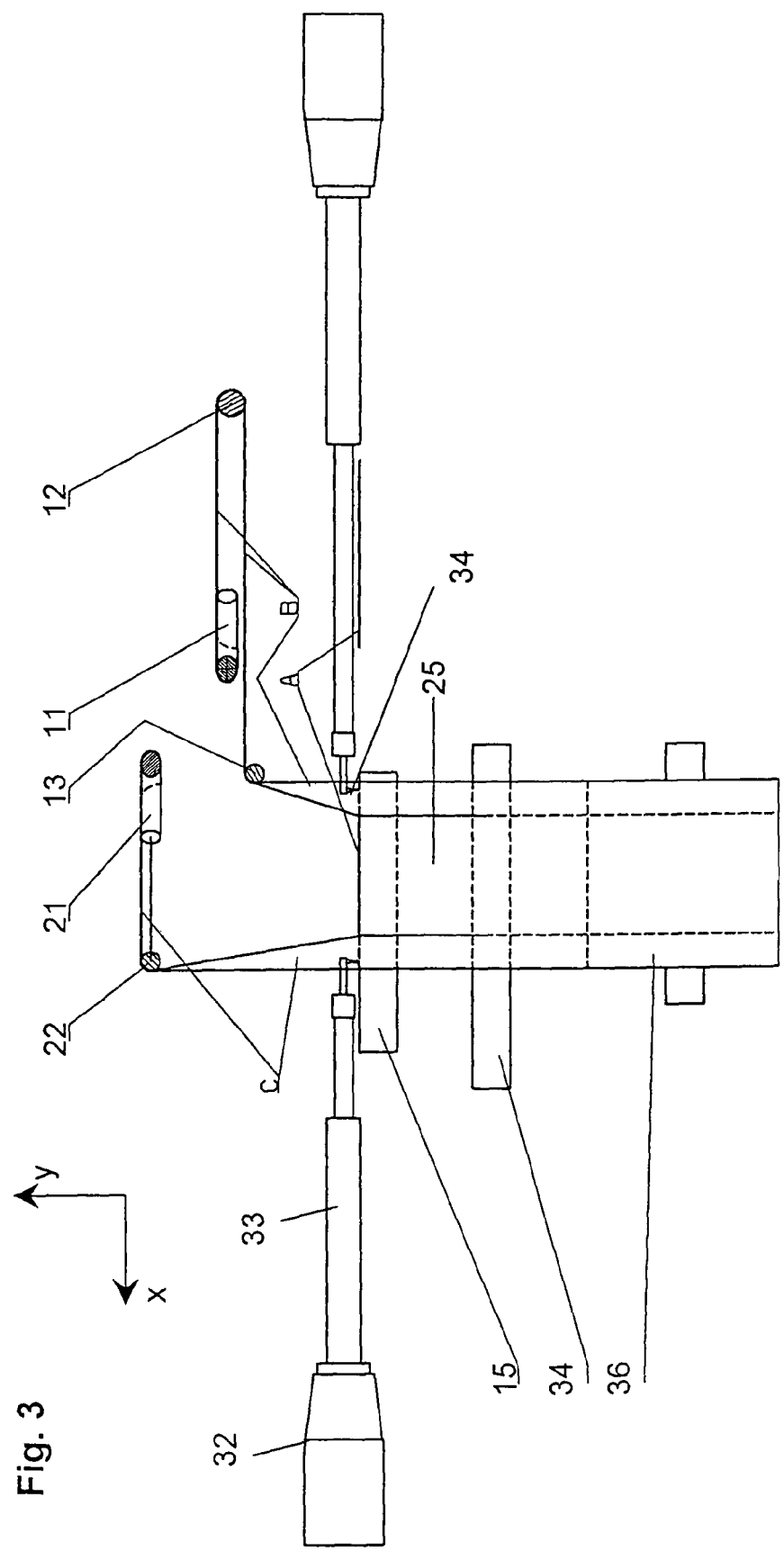
FIG. 3 Cross-section I-I of the device illustrated in FIG. 1

The film tube 25 is formed soon after leaving the roller clearance 50. First it is conveyed in the direction of the gravitational force. That is, as shown in FIGS. 1, 3, and 4, the film tube is conveyed in a direction that is substantially perpendicular to a transport direction of the web upstream of the joining process. This alignment of the film tube is advantageous for solidifying the joint seams 27 and/or for distributing the extrudate evenly.

Figure 2:
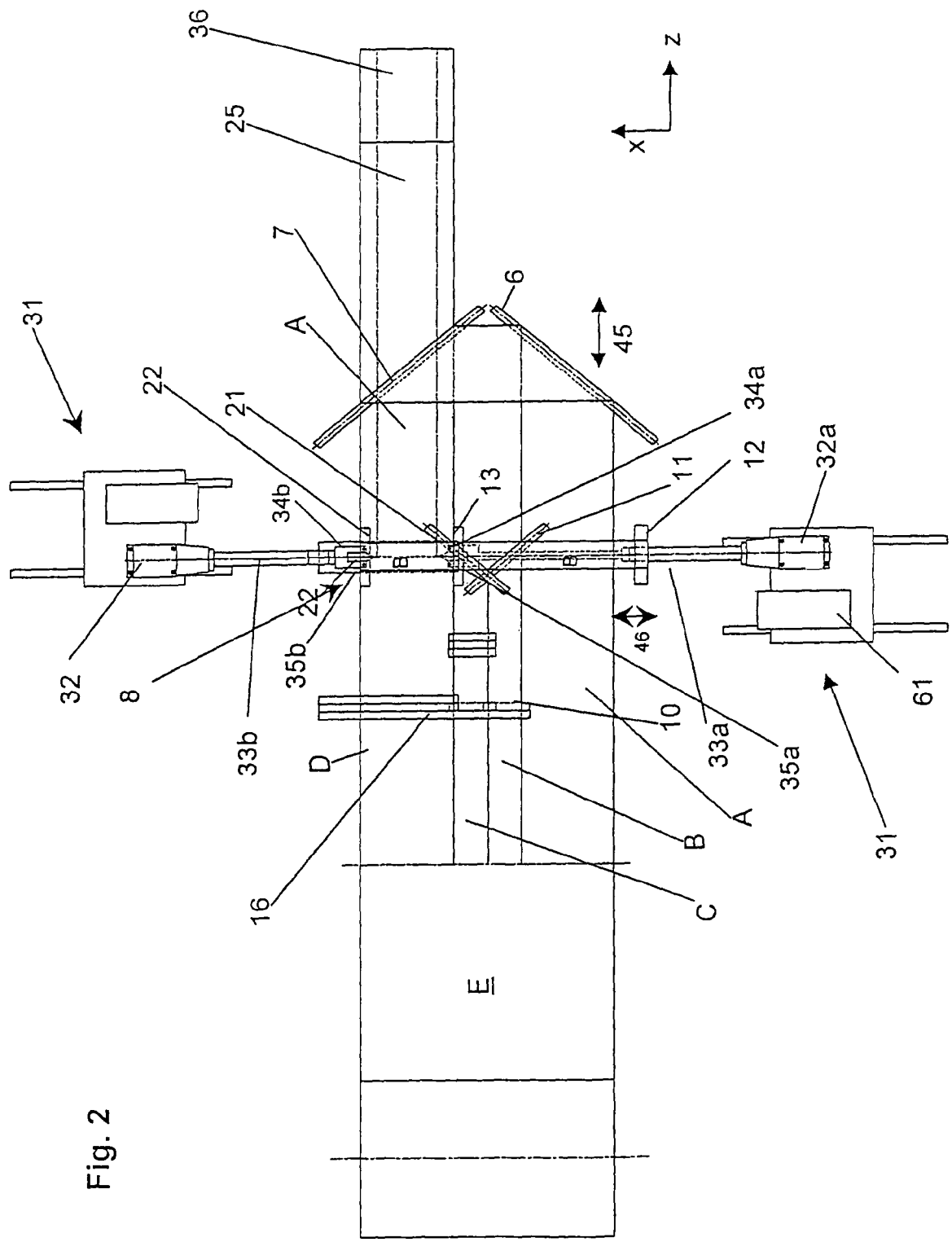
FIG. 2 Top view of the device according to the invention illustrated in FIG. 1

Finally the film tube 25 moves by means of the rollers 38 and 39 to the winding station 36 that is illustrated symbolically in the figures. FIGS. 1 to 3 also illustrate the motor 60 that transfers a torsional moment on the extruder by means of a belt that is not illustrated, a fan 61 and the machine frame 37. Additional adhesive elements of other machine components such as rollers or guide rods are not illustrated since the bearing and mounting of such components are obvious to those of skill in this art.

Similarly, other machine components that are well-known in principle, such as the winding and unwinding stations are illustrated symbolically.

Figure 5:
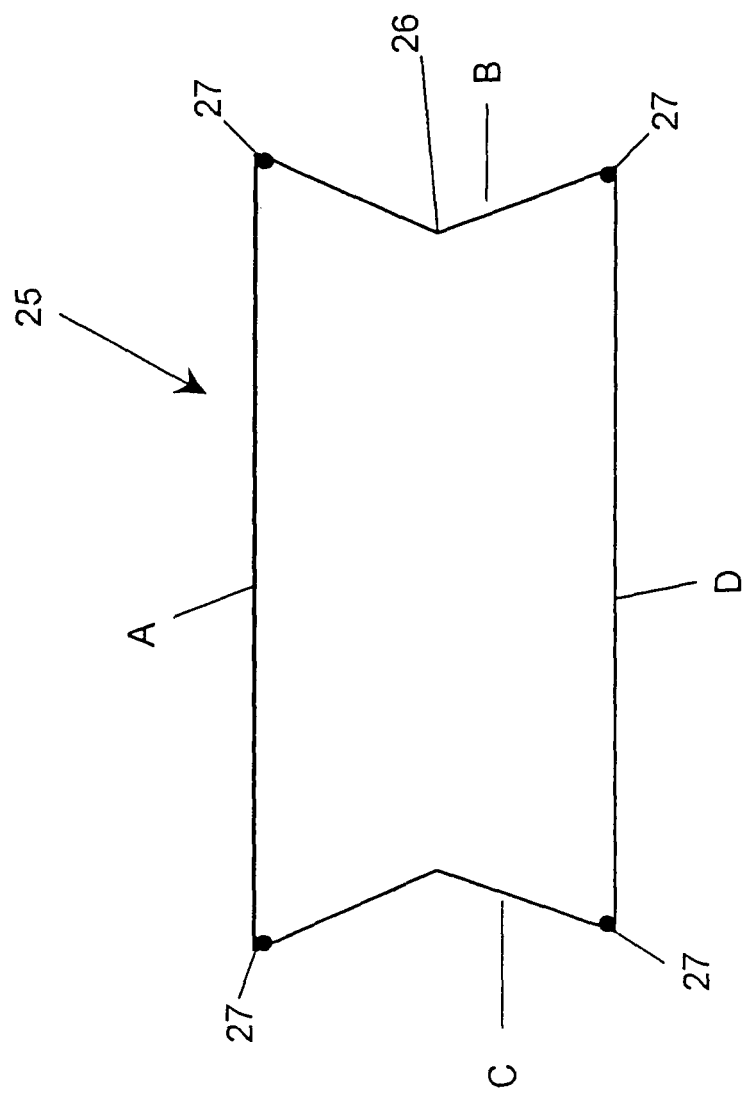
FIG. 5 A cross-section of a film tube according to the invention

FIG. 5 illustrates the cross-section of a bag 25 manufactured by the device pursuant to the invention. The figure illustrates the film webs A-D, the joint seams 27 joining them and also the side gussets 26.

Figure 6:
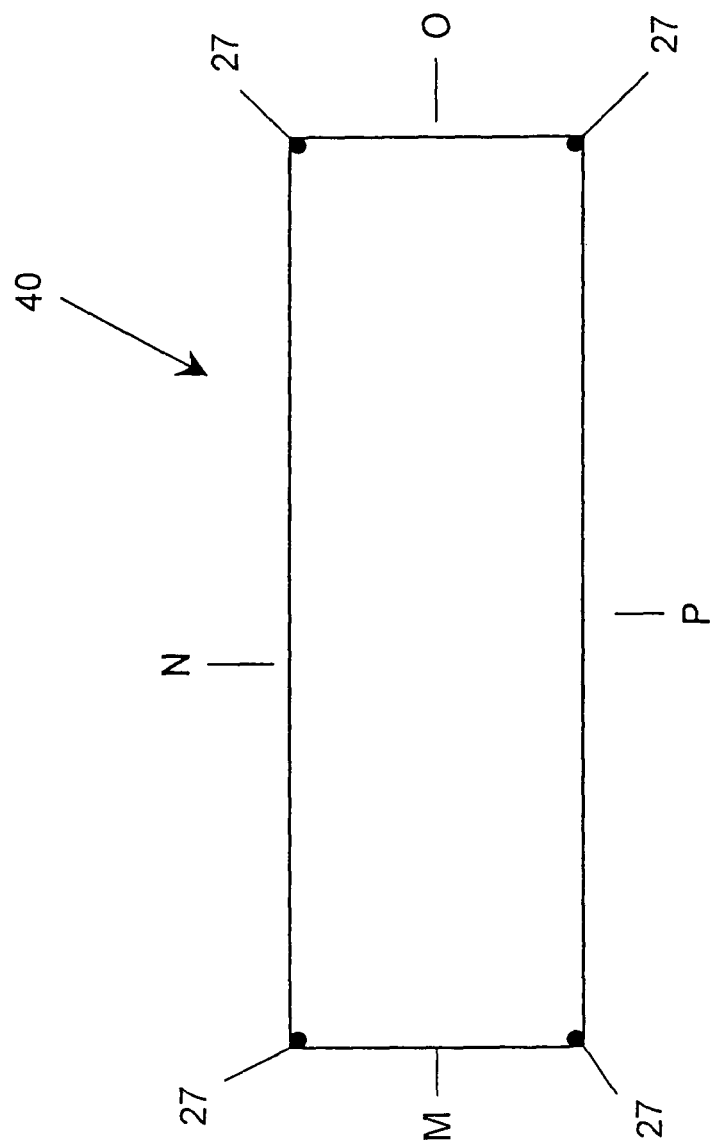
FIG. 6 A cross-section of an additional tube according to the invention

FIGS. 6 to 8 illustrate additional cross-sections of a bag pursuant to the present invention. The film tube 40 illustrated in FIG. 6, like the film tube 25, comprises of four joined seams 27 that join the four film webs M, N, O, and P to one another. As opposed to the film tube 25, film tube 40 has no side gussets 26.

In conclusion, it must be stated emphatically that the illustrated film tubes pursuant to the present invention can also be processed further to manufacture end products other than FFS-bags. Particularly, the side-gusseted film tube 25 can be used in various other applications.

To sum up the following points require to be mentioned: The process according to the present invention can usually be carried out without the use of forming shoulders that form the film tube. While joining the different film webs it is advisable to use additives such as adhesives or plastic extrudate. The process of contact welding can bring about some difficulties. It is particularly advantageous to join together several film webs. In the case of side-gussetted bags, it is advisable to join together four film webs on the edges of the side gussets formed subsequently. In view of the required production speed, it is advantageous if the welding elements and/or pressure-exerting devices such as rollers stop as the film is moved past them.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference symbols | |
|---|---|
| 1 | Device pursuant to the present invention |
| 2 | Unwinding station |
| 3 | Deflecting roller |
| 4 | Deflecting roller |
| 5 | Cutting station |
| 6 | Turning bar |
| 7 | |
| 8 | Joining station |
| 9 | Roller |
| 10 | Roller |
| 11 | Turning bar |
| 12 | Roller |
| 13 | Roller |
| 14 | Squeegee roller |
| 15 | Squeegee roller |
| 16 | Roller |
| 17 | Roller |
| 18 | Roller |
| 19 | Roller |
| 20 | Arrow |
| 21 | Turning bar |
| 22 | Roller |
| 23 | Roller |
| 24 | Arrow |
| 25 | Side-gussetted film tube |
| 26 | Side gusset |
| 27 | Joint seam |
| 28 | Blind seams |
| 29 | |
| 30 | Roller |
| 31 | Extrusion device |
| 32 | Extruder |
| 33 | Extruder arms |
| 34 | Nozzle, nozzle area |
| 35 | Nozzle |
| 36 | Winding station |
| 37 | Machine frame |
| 38 | Roller |
| 39 | Roller |
| 40 | Film tube |
| 41 | Film tube according to the present invention |
| 42 | Film tube |
| 50 | Roller clearance |
| 51 | Triangle made of section tubes |
| 60 | Motor |
| 61 | Fan |
| A-E | Film webs |
| U | Path of the flat film tube |

What is claimed is:

1. A device for manufacturing a film tube from a polymer and/or metal film material in the form of a plurality of film webs, comprising:
joining tools for joining edges of the plurality of the film webs to one another in a joining process so as to form the film tube having at least one longitudinal joint seam; and
at least one extrusion device that includes at least four nozzles configured to extrude a free-flowing substance onto at least four edges of the film webs to be joined,
the manufacturing device being configured to first convey the formed film tube directly downward in a direction of gravitational force after the edges of the film webs have been joined.

2. The device according to claim 1, wherein the joining tools include at least one roller with which the edges of the film webs are impinged with pressure during the joining process.

3. The device according to claim 2, wherein the joining tools include at least one roller clearance in which the edges of the film webs to be joined are pressed together.

4. The device according to claim 3, further comprising a system of film web transport and deflecting devices, which guides a plurality of the film webs on different paths into the roller clearance.

5. The device according to claim 4, wherein at least two devices for feeding the extrudate are arranged above the roller clearance, the at least two devices for feeding the extrudate being configured to impinge with the extrudate both edges of at least two of the film webs guided into the roller clearance.

6. The device according to claim 5, wherein each of the two devices for feeding the extrudate includes two extrudate nozzle areas located at a distance from one another and configured to extrude the extrudate onto the edges of the two film webs guided into the roller clearance.

7. The device according to claim 5, wherein nozzles or nozzle areas of the devices for feeding the extrudate are displaceable in a direction that is perpendicular to a conveying direction (z) of the film webs.

8. A device for manufacturing a film tube from a polymer and/or metal film material in the form of a plurality of film webs, comprising:
joining tools for joining edges of the plurality of the film webs to one another in a joining process so as to form the film tube having at least one longitudinal joint seam; and
at least one extrusion device that includes at least four nozzles configured to extrude a free-flowing substance onto at least four edges of the film webs to be joined,
the manufacturing device being configured to first convey the formed film tube in a direction that is substantially perpendicular to a transport direction of the web upstream of the joining process.

9. The device according to claim 1, wherein the formed film tube is conveyed in the direction of gravitational force so as to distribute the extrudate evenly on the seam.

10. A device for manufacturing a film tube from a polymer and/or metal film material in the form of a film web, comprising:
a cutting device that cuts the film web into a plurality of film web segments;
joining tools for joining edges of the plurality of film web segments to one another in a joining process so as to form the film tube having at least one longitudinal joint seam; and at least one extrusion device that includes at least four nozzles configured to extrude a free-flowing substance onto at least four edges of the film web segments to be joined, the manufacturing device being configured to first convey the formed film tube directly downward in a direction of gravitational force after the edges of the film web segments have been joined.

11. The device according to claim 8, wherein the direction of conveying the formed film tube is downward in a direction of gravitational force.

12. A device for manufacturing a film tube from a polymer and/or metal film material in the form of a plurality of film webs, comprising:

joining tools for joining edges of the plurality of the film webs to one another in a joining process so as to form the film tube having at least one longitudinal joint seam; and at least one extrusion device that includes at least four nozzles configured to extrude a free-flowing substance onto at least four edges of the film webs to be joined, the manufacturing device being configured to first convey the formed film tube directly downward in a direction of gravitational force after the edges of the film webs have been joined, the film tube being conveyed directly downward for a distance sufficient to solidify the joint seam and distribute the free-flowing extrudate evenly along the joint seam.

13. The device according to claim 12, further comprising a roller located downstream of the extrusion device at the distance at which the joint seam has solidified and the free-flowing extrudate has been distributed evenly along the joint seam, the roller conveying the formed film tube in a direction that is substantially parallel to a transport direction of the web upstream of the joining process.

\* \* \* \* \*